United States Patent
Jördens et al.

[11] Patent Number: 5,181,784
[45] Date of Patent: Jan. 26, 1993

[54] ELASTIC SLIDING BEARING III

[75] Inventors: Ernst-Günter Jördens, Damme; Hubert Siemer, Vechta, both of Fed. Rep. of Germany

[73] Assignee: Lemforder Metallwaren AG., Lemforder, Fed. Rep. of Germany

[21] Appl. No.: 798,493

[22] Filed: Nov. 26, 1991

[30] Foreign Application Priority Data

Nov. 29, 1990 [DE] Fed. Rep. of Germany ....... 4037966

[51] Int. Cl.$^5$ ............................................. F16C 17/10
[52] U.S. Cl. .................................. 384/222; 384/223; 384/296
[58] Field of Search ............... 384/222, 223, 275, 296, 384/220, 295

[56] References Cited
U.S. PATENT DOCUMENTS

| | | | |
|---|---|---|---|
| 4,744,677 | 5/1988 | Tanaka et al. | 384/222 |
| 4,809,960 | 3/1989 | Kakimoto | 384/222 |
| 4,878,767 | 11/1989 | Halder | 384/275 |
| 5,143,456 | 9/1992 | Jördens et al. | 384/275 |

Primary Examiner—Lenard A. Footland
Attorney, Agent, or Firm—McGlew and Tuttle

[57] ABSTRACT

An elastic sliding bearing for vehicle parts in motor vehicles, a rigid inner bushing (1) rotatably arranged in an outer bushing (2), and this is arranged in an elastomeric body (3) firmly adhering to the outer bushing. Both bushings have, at least at an axially outer end, axial bearing surfaces (8, 9) at one radially directed flange projection (7, 10) each. The flange projection (10) associated with the outer bushing is axially movably arranged in relation to this outer bushing (2) while an elastomeric intermediate member (11) undergoes elastic deformation.

6 Claims, 1 Drawing Sheet und 5,181,784

ELASTIC SLIDING BEARING III

FIELD OF THE INVENTION

The present invention pertains to an elastic sliding bearing for vehicle parts in motor vehicles in which a rigid inner bushing is rotatably arranged in an outer bushing and the outer bushing is arranged in an elastomeric body firmly adhering to the outer bushing and both bushings, at an axially outer end, axial bearing surfaces each at one radially directed flange projection.

BACKGROUND OF THE INVENTION

Such a bearing has been known from DE 38,00,314 - A1 and DE 38,04,886 - C2. It is used mainly to mount guide rails and has an outer bushing made of a rubberized metal, whose inner metal sleeve is in direct contact with the sliding surface of the inner bushing, and whose outer rubber body (elastomer) can be inserted into a bearing eye of a vehicle part. The flange projection extending on one side at the axial end of the inner bushing is made in one piece with the inner bushing. The radial flange projection at the axial end of the outer bushing is formed by a ring permanently connected to the outer bushing. Such bearings are designed as one-sided bearings per se and are mounted in a mutually mirror-inverted arrangement and tensioned relative to one another with an axial clearance, which is actually undesirable, in order to keep the torque low. To reduce the inherently high wear of such sliding bearings, the sealing lip made in one piece with the rubber body surrounds, in the prior-art design, the profile of the two flange projections of the inner bushing and outer bushing which are in contact with one another, and it touches, on the axially outer side, the flange projection at the inner bushing with a pre-tension. In addition, a coating consisting of a plastic possessing good sliding properties is provided between the radially expanding flange projections at the inner bushing and the outer bushing.

DE 36,13,123 - C2 discloses a sliding bearing, in which a plastic layer (polytetrafluoroethylene layer), is permanently provided on the inner bushing. The layer provides good sliding properties and is located between an inner bushing and an outer bushing. The inner gushing is surrounded by an elastomeric body (rubber body) that is connected to the outer bushing. The elastomeric body is surrounded by a rigid mounting bushing. Such sliding bearings cannot be used in the prior-art design for taking up axial loads.

A rubberized metal bearing for taking up axial and radial loads has been known from DE 23,42,990 - B2. This bearing is a molecular bearing which compensates for axial movements of the internal bearing parts in relation to the external bearing part only in the range of a permissible material deformation. Rotary sliding movements of the two parts in relation to one another do not take place in this prior-art bearing.

SUMMARY AND OBJECTS OF THE INVENTION

The task of the present invention is to provide an axially pre-tensioned sliding bearing of the design described in the introduction with a low friction torque and good antifrictional qualities, with axial spring characteristics that are independent of the radial spring characteristics, and at the lowest possible manufacturing cost.

According to the invention, an elastic sliding bearing is provided for vehicle parts in motor vehicles. The bearing comprises an inner bushing rotatably arranged in an outer bushing. The outer bushing is arranged in an elastomeric body which firmly adheres to the outer bushing. Each of the inner bushing and the outer bushing have bearing surfaces at one radially directed flange projection, the flange projection being arranged at an axially outer end. The elastomeric body is non-rotatably inserted into a mounting bushing. The mounting bushing is axially movably connected to the flange projection associated with the outer bushing by an elastomeric intermediate member. The elastomeric intermediate member includes means providing a cross section, in an axial direction, by which restoring forces, increasing with increasing axial displacement of the inner bushing in relation to the outer bushing, are built up on the elastomeric material of the intermediate member.

In a sliding bearing possessing these design characteristics, the radial loads and the axial loads are elastically absorbed by separate components in the known manner, so that the elastomeric body surrounding the outer bushing takes up only radial loads, and its spring characteristic can be optimally adjusted to these radial loads. In contrast, axial loads are compensated by the intermediate member arranged between the outer bushing and the radial flange projection associated with the outer bushing. The axial spring characteristic of this intermediate member can be optimally adapted to the axial movements in order to achieve a low friction torque. Correspondingly, the characteristics of the elastomeric materials for the elastomeric body taking up the radial loads and for the intermediate member may also be selected to be different. Further, the geometries of the elastomeric body and the intermediate member may be made different. A trapezoidal cross section is particularly suited for the intermediate member. By this structure restoring forces, which increase with increasing axial displacement of the inner bushing in relation to the outer bushing, are built up in the elastomeric material of the intermediate member. This can also be achieved with a cross section tapering toward the tip of the cone and other corresponding profilings of the intermediate member, and it can be supported by variations in the degree of hardness of the intermediate member over the cross section.

In a preferred embodiment, the intermediate member associated with the outer bushing is designed as a rubberized metal part which has, at its axial ends, metal rings of angular cross section, one of which forms the flange projection associated with the outer bushing, and the other can be permanently connected to a mounting bushing that can be inserted into a bearing eye of a vehicle part. On its sliding surface, which forms the axial bearing surface and cooperates with the sliding surface on the flange projection of the inner bushing, the metal ring acts as a radial flange projection possesses good sliding properties, which can be improved by coating with PTFE, by an inserted sliding ring, e.g., one made of the same material, or by other measures.

One particular embodiment of the arrangement according to the present invention provides for a one-piece bearing design. In this design, two inner bushings, are arranged mirror-inverted in relation to a common center plane. Further a common outer bushing, a common elastomeric body for taking up radial loads, and a common mounting bushing are provided. The axial ends of the mounting bushing are connected to an axially elastic intermediate member each. Each one of the intermediate members is connected to one of two flange projections associated with the outer bushing. Each of these flange projections cooperate with a flange projection at one of the two inner bushings. In the case of such a bearing design, the two inner bushings, arranged in a mirror-inverted manner in relation to one another, can be conventionally anchored in the vehicle part by a bolt extending through the inner bushings, and can be tensioned in the axial direction relative to another such that clearance-free mounting with minimal friction torque is possible. Axial loads in both directions are now compensated for by one of the two intermediate members, and the build-up of restoring forces which now takes place in the intermediate members, can be determined by the geometric shape, by material properties, and other parameters.

The intermediate member is preferably trapezoidal in section as noted above. The trapezoidal intermediate member consisting of an elastomeric material and the elastomeric body surrounding the outer bushing are preferably arranged in a firmly adhering manner on a mounting bushing that surrounds the elastomeric body and can be inserted into a bearing eye of a vehicle part. As a result of this construction, the intermediate member and elastomeric body are connected to one another. Two inner bushings may be arranged in a mirror-inverted manner in relation to a common center plane and may be provided with a common outer bushing, a common elastomeric body, a common mounting bushing and may be inserted into a bearing eye of a vehicle part. The common mounting bushing may be provided with axial ends which are connected to an axially elastic intermediate member which is connected to one of the two flange projections associated with the outer bushing. The flange projections cooperate with a flange projection, each at one of the two inner bushings. The two intermediate members are also arranged in a mutually mirror-inverted position in relation to a common center plane.

The intermediate member may be designed as a rubberized metal part with metal rings of angular cross-section at the axial ends. One of the metal rings may form a flange projection of the outer bushing and the other metal ring may be connected to a mounting bushing surrounding the elastomeric body.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings.

Embodiments of a divided bearing design and a one-piece bearing design with the characteristics of the present invention are represented in the drawing.

DETAILED DESCRIPTION OF THE PREFERRED EMBODIMENT

Figure 1:
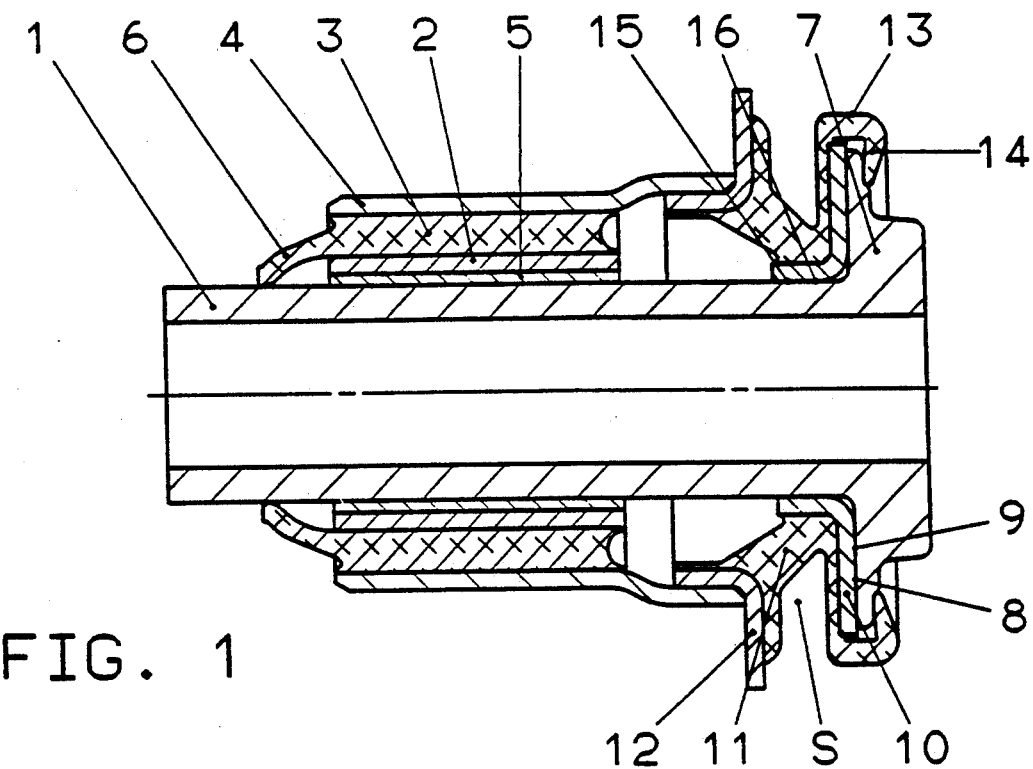
FIG. 1 is a sectional view taken in an axial plane through a two-piece bearing design.

A sliding bearing shown in Figure is inserted, in a mutually mirror-inverted arrangement, into one bearing eye in pairs or individually into two bearing eyes of a guide rail or the like, (not shown). This provides a connection of the sliding bearing to the longitudinal beams (not shown) of a motor vehicle by means of a bolt, also not shown in the drawing. The Figure of the drawing shows only one of the two bearings that form a pair. The sliding bearing consists of a rigid inner bushing 1, an essentially also rigid outer bushing 2, an elastomeric body 3 surrounding the outer bushing 2, and a mounting bushing 4, into which the elastomeric body 3, which is connected to the outer bushing 2 in a firmly adhering manner, is also inserted in a firmly adhering manner. To improve the sliding properties, a sliding layer consisting of a material with good sliding properties, e.g., a sliding bushing 5 made of PTFE is located between the inner bushing 1 and the outer bushing 2. At the end that is the axially inner end after mounting, the elastomeric body 3 is extended with an apron-like projection 6, whose edge lies sealingly around the inner bushing 1. At the end that is the axially outer end after mounting, the inner bushing is provided with a radially extending flange projection 7, which forms, in a radial plane, an axial bearing surface 8 which cooperates with a radial bearing surface 9 that is provided at a radial flange projection 10 which is in connection with the outer bushing 2. To improve the antifrictional properties, a layer consisting of a material with good sliding properties, e.g., a disk made of such a material, may also be inserted between the axial bearing surfaces 8 and 9. The flange projection 10, which is associated with the external bearing part, i.e., the outer bushing 2, has a radial bearing surface 15 which cooperates with a radial bearing surface 16 of the inner bushing 1 and is connected, via an intermediate member 11 made of an elastomeric material, to the mounting bushing 4 and consequently—via the elastomeric body 3—also to the outer bushing 2. The embodiment shows the intermediate member 11, designed as a rubberized metal part whose axial ends are formed by metal rings of angular cross section, of which the metal ring which is the axially outer metal ring after mounting, forms the radial flange projection 10 which is associated with the outer bushing 2, and the metal ring 12 that is the axially inner metal ring after mounting has a connection to the mounting bushing 4. The intermediate member 11 made of elastomeric material is designed in this embodiment as an intermediate member of trapezoidal shape in sections passing through the axial plane, wherein the cross section decreases from the inside to the outside in the axial direction. As a result, it can be achieved, assuming appropriate design, that small axial displacements of the inner bushing 1 in relation to the outer bushing 2 will build up in the intermediate member 11, restoring forces adapted to the torque, so that the friction torque of the bearing is not yet noticeably increased by this. Increasing axial displacements beyond the free path S cause an increase in the free path on the mirror-inverted side. When the free path S is reduced to nearly zero, the axial pre-tension on the part opposite the load is nearly eliminated. A further reduction of the free path is not possible, and neither is a further reduction of the pre-tension, so that no clearance can develop between 10 and 7 and 8 and 9. To improve the sealing of the bearing, the elastomeric material of the intermediate member 11 is made in one piece with a support edge 13 surrounding the axial bearing surfaces 8 and 9 on the outside, and the lip-like edge 14 of the support edge is in contact with the flange projection 7 at the inner bushing 1 axially on the outside and, after assembly, also with a vehicle part receiving the bearing.

Figure 2:
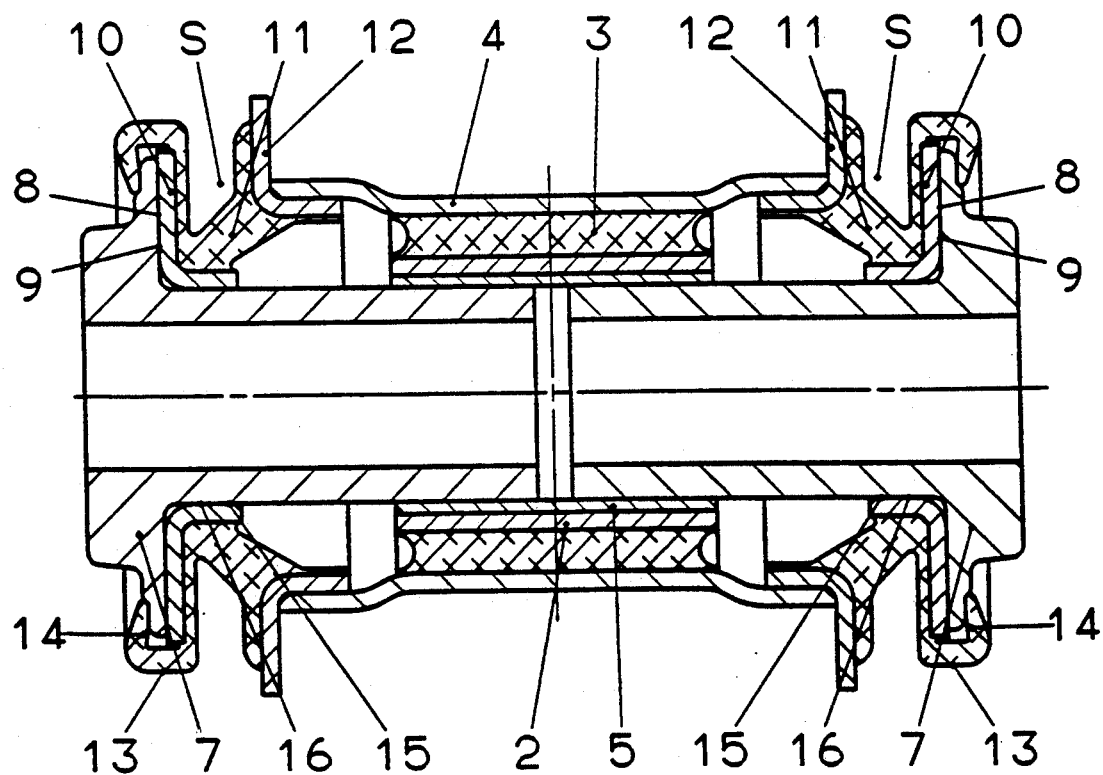
FIG. 2 is a sectional view corresponding to FIG. 1 in an axial plane through a one-piece bearing design.

The embodiment according to FIG. 2 shows the application of the design characteristics described with reference to a one-piece bearing design. In this arrangement, two inner bushings 1 are arranged in a bearing in mirror-inverted positions in relation to a radial center plane and can be connected to a vehicle part by a bolt (not shown) that passes through the inner bushings 1 and can be tensioned relative to one another. The radial flange projections 7 of the two inner bushings 1 are consequently located at the axially outer ends of the bearing. Their axial bearing surfaces 8 cooperate with an axial bearing surface 9 each at a flange projection 10, both of which are associated with a common outer bushing 2. The two inner bushings 1 partially engage the common outer bushing 2 with their axially inner ends that are directed toward one another. The antifrictional properties of the bearing are improved by a sliding bushing 5 in this case as well. The outer bushing 2 is surrounded on the outside by an elastomeric body 3 which is arranged on the outer bushing 2 in a firmly adhering manner and extends into a likewise common mounting bushing 4 in a firmly adhering manner. The metal rings 12 with angular cross section, which are part of the intermediate member 11 designed as a rubberized metal part, as was explained in connection with FIG. 1, are connected to the axial ends of the common mounting bushing 4. A collar edge 13 with a lip-like edge 14 surrounding the axial bearing surfaces 8 and 9 to ensure sealing between the bearing and the adjacent vehicle part is shown in this arrangement as well.

The radial bearing surfaces 15 and 16 in both embodiments may also enclose a sliding bushing between them or may be coated with a material possessing good sliding properties.

While a specific embodiment of the invention has been shown and described in detail to illustrate the application of the principles of the invention, it will be understood that the invention may be embodied otherwise without departing from such principles.

What is claimed is:

1. An elastic sliding bearing for vehicle parts in motor vehicles, comprising:
    an inner bushing having an axially outer end with a radially directed inner bushing flange projection;
    an outer bushing arranged in an elastomeric body, said elastomeric body firmly adhering to said outer bushing, said outer bushing having a radially directed outer bushing flange projection providing an axial bearing surface at an axially outer end, said inner bushing being rotatably arranged in said outer bushing;
    a mounting bushing, said elastomeric body being non-rotatably inserted into said mounting bushing, said mounting bushing being axially movably connected to said outer bushing flange projection by an elastomeric intermediate member, said elastomeric intermediate member providing a cross-section, in the axial direction, by which restoring forces are built up in an elastomeric material of said elastomeric intermediate member, said restoring forces increasing with increasing axial displacement of said inner bushing in relation to the outer bushing.

2. An elastic sliding bearing according to claim 1, wherein said intermediate member is trapezoidal in a section passing through an axial plane.

3. An elastic sliding bearing according to claim 2, wherein said trapezoidal intermediate member and said elastomeric body surrounding said outer bushing are arranged in a firmly adhering manner on said mounting bushing surrounding said elastomeric body for insertion into a bearing eye of a vehicle part.

4. An elastic sliding bearing according to claim 1, wherein another inner bushing is arranged in a mirror-inverted manner with respect to said inner bushing in relation to a common center plane, said outer bushing extending over a portion of each of said inner bushing and said another inner bushing to form a common outer bushing, said elastomeric body extending over said common outer bushing to form a common elastomeric body, said mounting bushing extending over said common elastomeric body to form a common mounting bushing, one axial end of each of said common outer bushing, common elastomeric body and common mounting bushing being connected to said elastic intermediate member and another axial end of each of said common outer bushing, common elastomeric body and common mounting bushing being connected to another axially elastic intermediate member, said another axially elastic intermediate member being connected to another flange projection of said outer bushing, said outer bushing flange projection and said another outer bushing flange projection cooperating with flange projections of said two inner bushings.

5. An elastic sliding bearing according to claim 4, wherein said intermediate member and said another intermediate member are arranged in a mutually mirror-inverted position in relation to the common center plane.

6. An elastic sliding bearing according claim 1, wherein said intermediate member is formed as a rubberized metal part with metal rings of angular cross-section at axial ends, one of said metal rings forming said outer bushing flange projection and another of said metal rings being connected to said mounting bushing surrounding said elastomeric body.

* * * * *